J. M. Milligan,
Bandage.
No. 493.
Reissued Sep. 15, 1857.
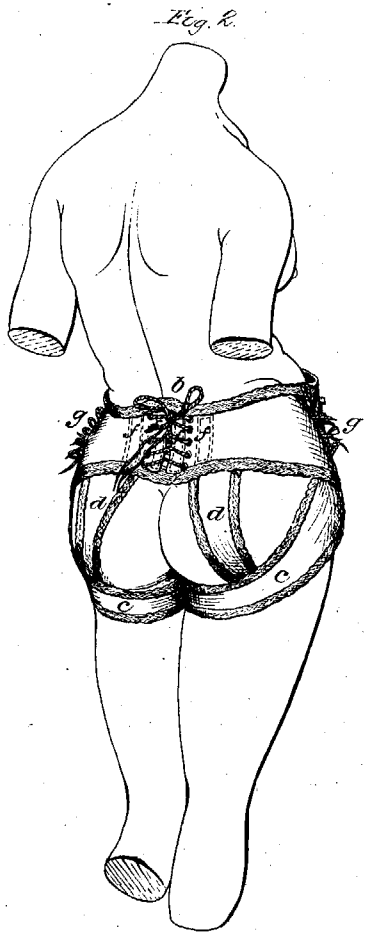
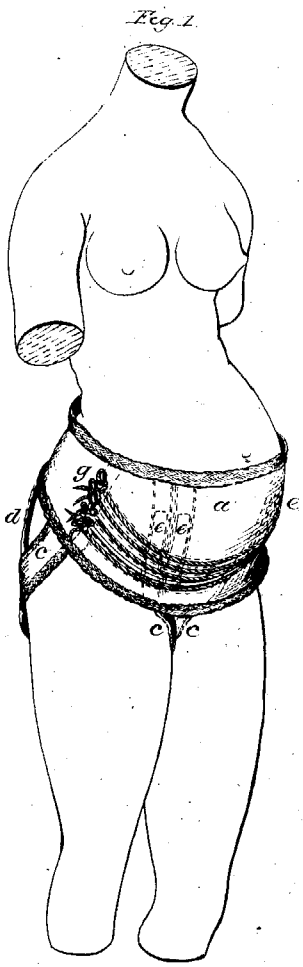

UNITED STATES PATENT OFFICE.

JULIA M. MILLIGAN, OF NEW ALBANY, INDIANA.

IMPROVED ABDOMINAL SUPPORTER.

Specification forming part of Letters Patent No. 16,602, dated February 10, 1857; Reissue No. 493, dated September 15, 1857

*To all whom it may concern:*

Be it known that I, JULIA M. MILLIGAN, of New Albany, Floyd county, Indiana, have invented a new and useful Improvement in Abdominal Supporters; and I do hereby declare the following to be a full, clear, and exact description thereof, reference being had to the annexed drawings, making part of this specification.

The object of my invention is to provide for a prolapsed condition of the abdomen, a healthful and properly-distributed support, and one capable of nice and ready adaptation to the changing condition of the patient.

The accompanying drawings represent my supporter applied to the person, Figure 1 being a front, and Fig. 2 a back, view.

*a* is a piece of any suitable woven stuff—such as India twill or stout muslin linen or silk—adapted to neatly fit and surround the person of the patient, and covering in front all of the abdomen below the navel, whence, being passed around the hips, its ends are laced, *b*, or otherwise drawn together, over the sacrum. This piece, called by me "the bandage," is widest in front, whence its lower edge curves upward and backward, so as to occupy only so much surface of the hips and back as to afford an adequate counter-bearing to the downward and outward stress of the abdomen. The ultimate support or counter-bearing is thus made to devolve on the parts immediately overlying the side and posterior portions of the pelvis, innominata and sacrum. Two bands, *c*, are each attached at one end to the inner side of the bandage *a*, a little above the os pubis, and, being looped behind each leg at its junction with the body, the other end is fastened to the bandage behind. These loops serve to hold the bandage down to its proper place on the person. A brace, *d*, extends from the bandage to the bight of each loop, and by preventing it from sagging secures the free exercise of the limb. Stays (see red lines *e*) of whalebone or other suitable elastic substance are inserted in the front part of the bandage, with their lower ends at the place of front attachment of the loop near the base of the abdomen, whence they diverge upward at an angle of fifteen to twenty degrees from the middle line. Other stays (see dotted lines *f*) are inserted near to and parallel with the ends of the bandage. These stays *e* and *f* serve to prevent the wrinkling of the bandage. A series of cords, *g*, (of greater or less number, according to the wants of the patient,) are so incased in the bandage as that the lowest one follows, or nearly follows, the contour of the base of the abdomen, and the others range parallel, or nearly parallel, thereto. These cords are severally drawn tight at will, and are retained to a given tension by being knotted or otherwise made fast where they emerge from the bandage. The apertures through which the cords pass to the outside for this purpose should have their margins protected by eyelets or suitable stitching, and should range in a line slightly anterior to the hip bone.

At the first application of the supporter most patients will find it necessary to tighten only the lower cord, or the two or three lower ones, the others being tightened one by one as the abdomen resumes its normal condition. The back lacing is likewise commenced at the lower edge and continued upward correspondingly to that in front. The upper part of the bandage and the portion of it below the front cords should fit loosely, so as to avoid any confinement of the person or curling under of the edges of the bandage. A lining is applied under all the cords and stays to prevent local irritation and congestion.

For very fleshy persons, fewer cords may be employed, and gussets may be inserted in the upper edge of the bandage over the abdomen and in its lower edge over the hips. In some cases one or more additional front cords terminating at the stays *e* may be inserted above those shown.

The loops *c* may be replaced by drawers.

This form of supporter may be worn by the patient either erect or reclining without obstructing any vital function, and it may be washed like any customary garment.

I claim as new and of my invention—

The bandage *a*, substantially as described, provided with a series of cords, *g* and laces *b*, or their equivalents, applied and operated substantially in the manner and for the purposes set forth.

In testimony of which invention I hereunto set my hand before two subscribing witnesses.

JULIA M. MILLIGAN.

Attest:

GEO. H. KNIGHT,
JAS. H. GRIDLEY.